United States Patent [19]
Noll et al.
[11] 3,816,648
[45] June 11, 1974

[54] SCENE INTRUSION ALARM

[75] Inventors: Thomas K. Noll; Robert E. Billingsley, both of Fort Wayne, Ind.

[73] Assignee: The Magnavox Company, Ft. Wayne, Ind.

[22] Filed: Mar. 13, 1972

[21] Appl. No.: 234,165

[52] U.S. Cl. .......................... 178/6.8, 178/DIG. 33
[51] Int. Cl. .......................................... H04n 7/18
[58] Field of Search...178/DIG. 21, DIG. 33, DIG. 38, 178/DIG. 36, 6.8; 340/258, 258 C, 258 D, 276

[56] References Cited

UNITED STATES PATENTS

| | | | |
|---|---|---|---|
| 3,553,358 | 1/1971 | Lauer | 178/6.8 |
| 3,603,729 | 9/1971 | Sperber | 178/6.8 |
| 3,610,822 | 10/1971 | Ingham | 178/DIG. 33 |
| 3,641,257 | 2/1972 | Taylor | 178/DIG. 33 |

*Primary Examiner*—Howard W. Britton
*Attorney, Agent, or Firm*—Richard T. Seeger

[57] ABSTRACT

A video motion detector is disclosed for use in conjunction with one or more closed circuit television cameras and a video monitor, recorder or other closed circuit television surveillance equipment. The video motion detector monitors selectable portions of a scene and provides an alarm indication in response to detected motion in those selected portions of the scene. The system uses the synchronization signals from the camera, retimes those signals, and uses them to gate video information into a processor which integrates the selected portion of the scene, compares this integral with a specified previously stored integral and provides an output alarm if the comparison difference exceeds a predetermined value.

16 Claims, 15 Drawing Figures

SCENE INTRUSION ALARM

BACKGROUND OF THE INVENTION

The present invention relates to a video motion detector or scene intrusion alarm to be used in conjunction with prior art closed circuit television security systems to provide automatic surveillance of a scene being monitored and to provide an alarm indication when selected areas of that scene change. Prior art systems for automatically monitoring closed circuit television scenes may, for example, employ a complex processor operating on digital filtering and correlation techniques to monitor the entire scene and provide alarm functions. This type of prior art system will, of course, provide an alarm when any portion of the scene changes, however, this type of prior art system requires an extensive amount of hardware, is quite complex and as a result is far too costly for most installations. Another prior art approach is to provide light sensitive elements which mechanically attach to a video monitor screen, for example by means of a suction cup, to detect changes in the monitor brightness at the point of attachment on the screen. While this second technique is quite economical it has the drawback of obscuring the monitor screen in the areas of the light sensitive elements and of providing false alarms if, for example, the entire monitor brightness of contrast changes. The second system also is limited to monitoring the area encompassed by the light sensitive element and it is cumbersome to change the specific area being monitored.

There have been further recent prior art attempts to provide more convenient and economical automatic scene intrusion alarm systems such, for example, as illustrated by U.S. Pat. Nos. 3,597,755; 3,590,151; and 3,603,729. These more recent prior art monitoring schemes generally require that the alarm system processor itself generate the synchronization signals for the remainder of the closed circuit television system, may only provide for sampling areas of fixed size, may be limited to a single sampling area, and are still generally too expensive for the system limitations of the average potential user. Accordingly it is a primary object of the present invention to provide an economical video motion detector.

SUMMARY OF THE INVENTION

The present invention accomplishes its primary object by separating horizontal and vertical synchronizing signals from a closed circuit television camera generated composite video signal, providing from the vertical synchronizing signals a pair of signals having a repetition rate one half that of the vertical synchronizing signals, retiming each of these one half repetition rate signals and gating each of them conjunctively with the horizontal synchronizing signals, retiming the thus gated signals, and gating the incoming video information signals to a processor in accordance with the retimed gated signals so that the processor is presented with a single horizontal scan line or a portion thereof for each field of the two field frame of information provided by the camera. Thus a single processor alternately processes each of two horizontal scanning lines during alternate fields in a frame so as to insure good separation in the processor between the two sampling areas. The processor integrates the video information signals gated into it and converts the thus integrated information into a digital form for storage in a small capacity digital memory.

The storage capacity requirements of the present invention are materially reduced from those of the prior art since two horizontal lines rather than 525 are being monitored and further since, rather than monitoring a number of discrete points across the line, the integral of the signal across the line or a segment thereof is stored as but a single value.

The actual width of the horizontal video line gated to the integrator is adjustable by a front panel width control. Mechanically slaved to this width control is a variable resistor (dual potentiometer) used to vary the time constant of the integrator as a function of the width control setting. This serves to maintain constant processing gain in the system irrespective of the size of the sample selected and also assures operation of the processor over its maximum dynamic range. (Prevents system from saturating on a wide selected area or conversely prevents low sensitivity when minimum sample width is selected).

Subsequent integrated video information signals are compared to the stored digital information and an output alarm signal is energized when the difference between the stored and subsequent signals exceed a predetermined threshold. The stored value is updated periodically so that slow changes in the sampling area do not trigger the alarm.

Since the integral or average values are being compared a small change in brightness in a small fraction of the horizontal line of video information being monitored will not affect the average very much and thus may not trigger the alarm. To overcome this effective loss of sensitivity the width of the portion of the horizontal line being integrated has been made adjustable so that an operator can adjust the width to match the expected size of an intruder for maximum sensitivity. For example, if a doorway occupied only a small portion of a televised scene, instead of gating the entire horizontal line from the video for integration and processing, only the portion of the horizontal line passing through the doorway would be selected. This would maximize the sensitivity of the system to an intruder passing through the doorway since the sample width has been approximately matched to the expected size of an intruder and nearly the entire portion of the sampled video waveform will change when a person appears in the doorway.

An intruder can pass through a scene very quickly or very slowly and an acceptable intrusion alarm system should be triggered in both cases. Since the television camera is actually sampling the complete scene 30 times per second (one field) this sets an upper limit on the speed of an object which is detectable by the system. Extremely slow changes in the video level can be caused by changes in ambient light at the scene and by drift in camera circuitry. If natural light is illuminating the scene changes in brightness can be relatively slow such as, for example, a cloud passing overhead, and can be rather large in amplitude. To keep the system from falsely triggering the alarm for these slow changes a compromise concerning slow target detection must be made and this is made by both updating the reference signal level and predetermining a threshold value such that changes from the reference value less than this threshold do not trigger an alarm.

Accordingly, it is another object of the present invention to time share a video information signal processor relative to two sampling areas in a monitored scene.

It is a further object of the present invention to provide a scene intrusion alarm employing a relatively simple signal processor.

Yet another object of the present invention is to provide a video motion detector having minimal storage requirements.

A further object of the present invention is to provide a system for sampling a closed circuit television scene wherein the surveillance zones sampled may be varied both in location and size.

It is a still further object of the present invention to provide a video motion detector utilizing the camera generated synchronizing signals to gate video information to a processor.

It is yet another object of the present invention to provide a video motion detector which is compatible with existing closed circuit television systems.

BRIEF DESCRIPTION OF THE DRAWING

The foregoing as well as other objects and advantages of the present invention will appear more clearly from the following detailed disclosure read in conjunction with the accompanying drawings wherein like reference symbols represent like or similar elements and in which.

DESCRIPTION OF THE PREFERRED EMBODIMENT

Figure 1:
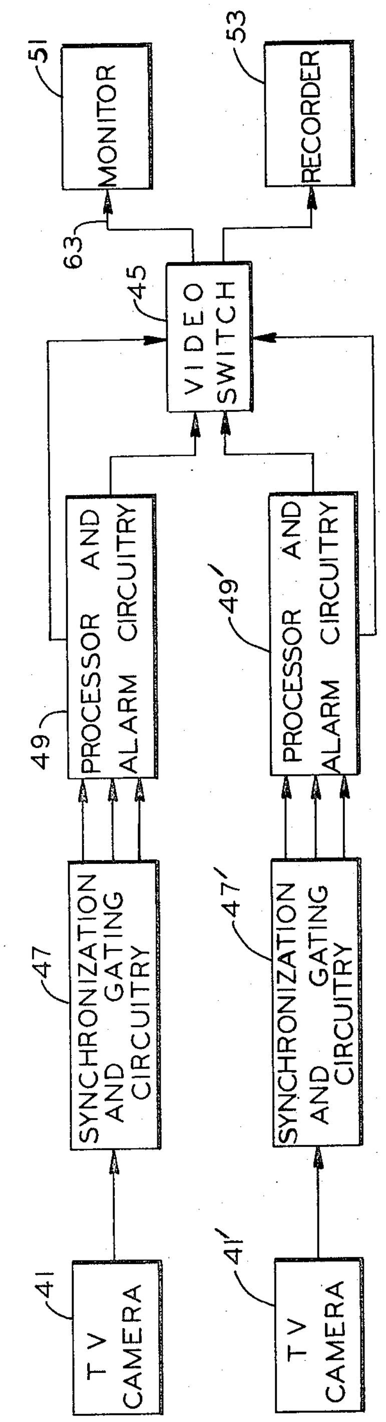
FIG. 1 is a block diagram of a closed circuit television surveillance system employing the present invention.
Figure 2:
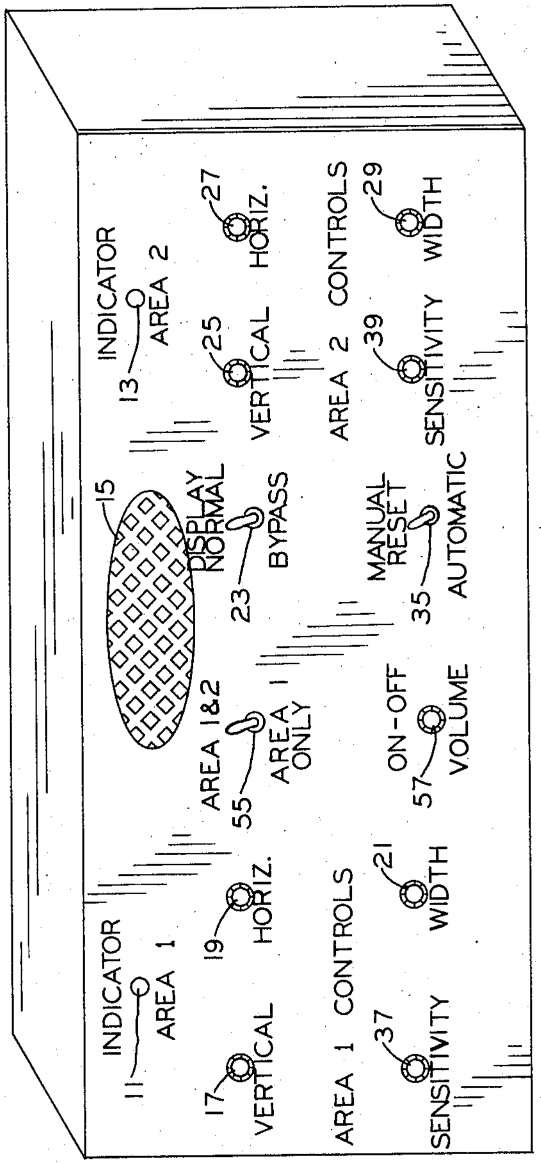
FIG. 2 is a perspective view of a video motion detector employing the principles of the present invention.

Considering first FIG. 1 which shows a block diagram of an over-all system employing the present invention, a standard closed circuit television camera 41 is shown and this camera, of course, provides a composite video signal containing both video and synchronizing information. The camera output is supplied to synchronization and gating circuitry 47 as well as to processor and alarm circuitry 49 and these last two mentioned portions 47 and 49 comprise the circuitry found in the video motion detector unit illustrated in FIG. 2. The output from the processor and alarm circuitry provides the normal visual monitoring by way of monitor 51 and may also provide a record of activities on a video tape recorder 53.

The video motion detector unit has controls for two distinct sampling areas grouped to the left and right respectively of the control panel and further provides a switch 55 for either monitoring both areas or only area number 1. The video motion detector control panel also has a common on-off switch integral with a volume control at 57 for setting the audio level of the audio alarm provided by a speaker 15. Indicator lights 11 and 13 are also provided on the control panel and will be energized indicating an alarm condition when their respective sampling areas have been violated. The function of the remaining controls illustrated on the control panel of FIG. 2 will appear more clearly from the discussion of the detailed block diagrams of FIGS. 3, 4 and 5.

Figure 3:
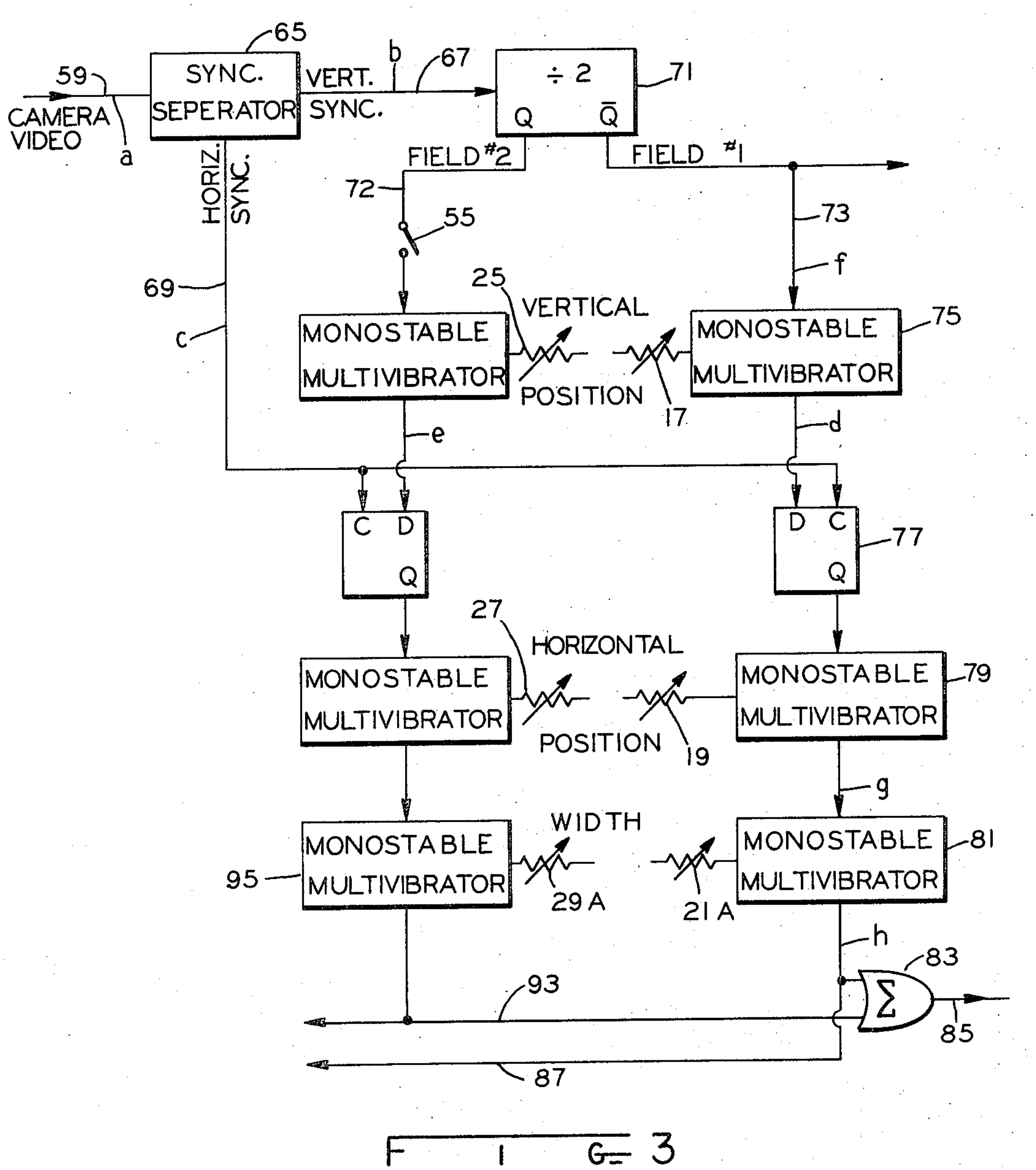
FIG. 3 is a detailed block diagram of the synchronization and gating circuitry of FIG. 1.

Considering first FIG. 3 an input composite video signal from a closed circuit television camera which includes both video and synchronization information is supplied to a synchronization separator 65 which may be of the type employed in the typical home television receiver and which functions to separate out vertical synchronization signals on line 67 and horizontal synchronization signals on line 69. The vertical synchronization signals are supplied to a divide by two counter 71 which may, for example, be a simple bistable multivibrator and which provides for the distribution of every other vertical synchronization pulse by way of line 73 while the alternate pulses are supplied on line 72. Thus in essence the signals on lines 72 and 73 are square waves at one half the repetition rate of those vertical synchronization signals.

The two vertical parallel paths in the block diagram of FIG. 3 are substantially identical and only the right hand path which corresponds to field number 1 will be discussed in detail. The one half repetition rate signals appearing on line 73 are supplied to a monostable multivibrator 75 having an adjustable resistance 17 for varying its time constant. Thus this monostable multivibrator 75 functions to retime the one half repetition signals so as to determine the specific horizontal line to be sampled. The output of the monostable multivibrator 75 and more particularly the trailing edge of that output pulse is supplied to a gate 77, for example a "D" latch, which receives as its other input the horizontal synchronization signals by way of line 69. Thus the gate 77 conjunctively gates the one half repetition rate signal and the horizontal synchronization signal to provide an output signal to another monostable multivibrator 79. The monostable multivibrator 79, like its predecessor, has an adjustable resistance 19 for controlling the time constant and thus determining the end of its output pulse to define the horizontal position of the sample line. This output pulse is supplied to yet another monostable multivibrator 81. Still another time constant varying resistance 21A controls the monostable multivibrator 81 to determine how long this monostable multivibrator 81 is in one of its conducting states and in essence provides an output pulse which defines the beginning and end and thus the width of the segment of a given scan line which is to be sampled. This last sample signal along with a similar sample signal for field 2 derived by way of the left hand column is fed to a summer 83 which by way of line 85 and switch 23 of FIG. 4 supplies a visual indication to the television monitor 51 of the actual areas of the scene being sampled.

Figure 4:
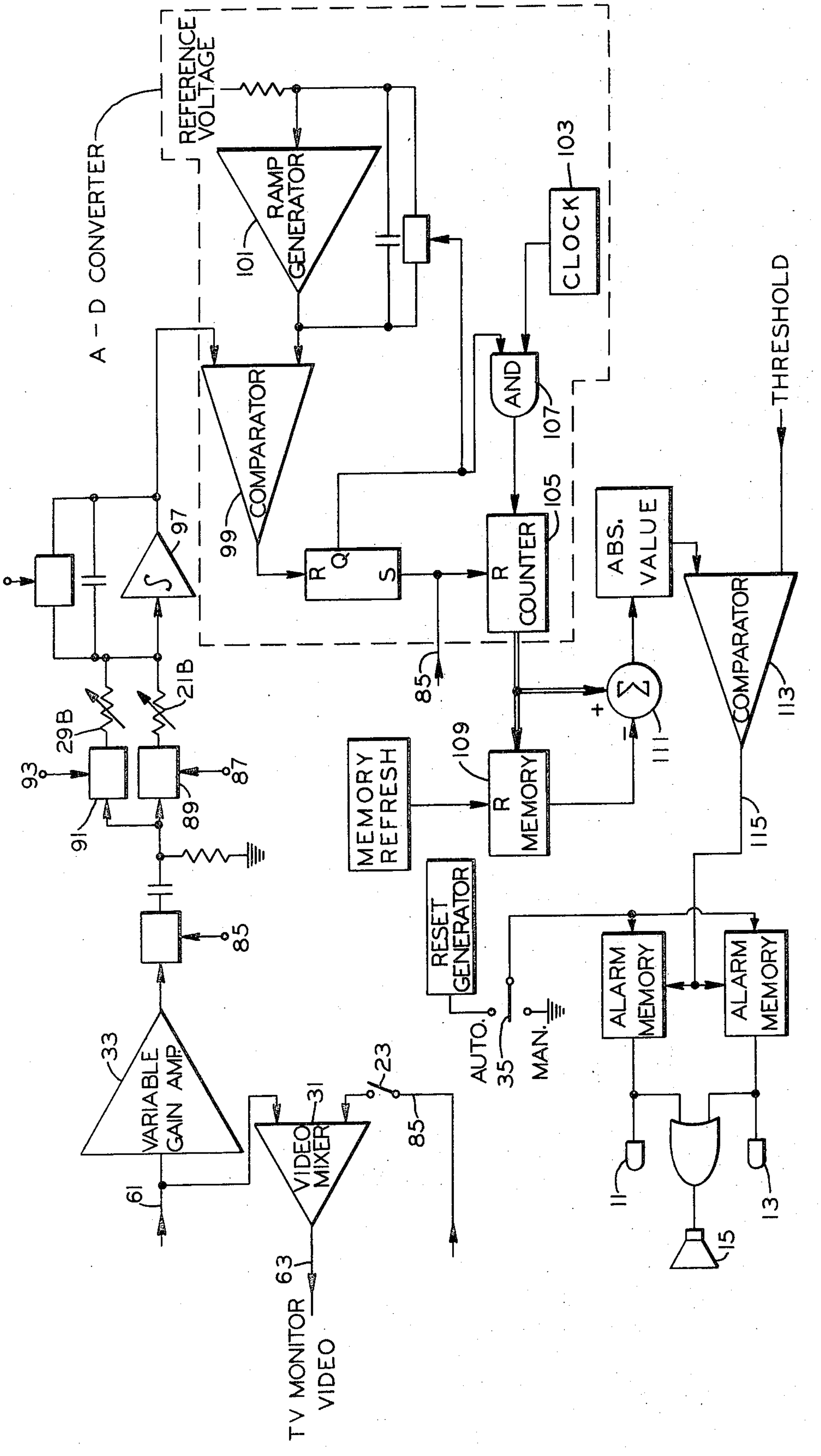
FIG. 4 is a detailed block diagram of the processor circuitry of FIG. 1.

The output from this summer 83 may be disabled by opening switch 23 of FIG. 4 so that the television monitor does not disclose the particular areas being sampled. The output pulse from monostable multivibrator 81 is also supplied by way of line 87 to a gate 89 of FIG. 4 which serves to supply the video information from the camera to the processor of FIG. 4 only during the period of the enabling pulse coming from the monostable multivibrator 81. A second gate 91 receives the enabling signals for field 2 by way of the line 93. In summary the several monostable multivibrators of FIG. 3 have the time during which they are in a given state controlled by variable resistances 17, 19, 21A, 25, 27 and 29A. The variable resistors 17 and 25 in effect select the horizontal line which is to be sampled, the variable resistors 19 and 27 may be varied to select one endpoint of the horizontal sample and the resistors 21A and 29A may be varied to determine the width of that horizontal sample. ·The horizontal sample discussed above, of course, determines what portion of the camera video is to be processed by the processor and alarm circuitry illustrated in FIG. 4.

The video information from the closed circuit television camera is provided to the processor and alarm circuitry by way of line 61 and is supplied to a summing amplifier 31 which if the switch 23 is in its "on" position superimposes the markers indicating the areas being sampled and the view of the scene being monitored and supplies this composite picture to the video monitor 51 by way of line 63. Of course if the switch 23 is in its "off" position the markers are not displayed on the monitor, however, the processor and alarm circuitry are still operative.

The incoming video information on line 61 is amplified in a variable gain amplifier 33 which is used to set the over-all sensitivity of the detection system. This amplifier can be an AGC amplifier to automatically compensate for variations in camera output and cabling losses. If this amplifier is made with AGC, the AGC time constant must be long to prevent the AGC circuit from normalizing any variations caused by movement in the scene that is to be detected.

The video passes from the output of variable gain amplifier 33 through a video switch and is then capacitively coupled to gates 89 and 91 which as noted earlier are enabled in accordance with pulse outputs from the monostable multivibrators 81 and 95 by way of lines 87 and 93 respectively.

The time constant of this AC coupling circuit is very long with the main purpose of the circuit being to not only remove the DC level from the input of the integrator but also to set the average value of the video signal gated to the integrator at zero on a long term basis to insure that under static scene conditions, the output of the following integrator circuit is zero.

The following integrator is a bipolar signal device since the average value of the video can either increase or decrease when a disturbance in the scene occurs. The dynamic range of the integrator is centered about zero therefore the AC coupling capacitor by setting the average value of the input gated video to zero sets the quiescent operating point of the integrator under static scene conditions at the mid point of its dynamic range. Thus the maximum dynamic range of the system is always automatically utilized and maximum system sensitivity can be achieved. The time constant of this AC coupling network must be made long to prevent changes in video caused by a scene disturbance from being differentiated from the scene video and thus not detected by the ensuing alarm system.

The AC coupled video is now gated at the appropriate time by gates 89 and 91 with their respective control signals on lines 87 and 93 and is applied to the integrator circuit consisting of the operational amplifier 97 utilizing capacitive feedback, and variable resistors 21B and 29B which adjust the time constant of the integrator independently for each gate in such a manner as to maintain the over-all system sensitivity constant independent of the width of the video line being integrated. The output of the integrator $V_o$ is proportional to the input current and the time integrated, i.e., ($V_o \alpha i_{in} t$) where $t$ is the width of the gated video and i is the input current or $i = E_{in}/R_{series}$. t is directly proportional to the resistance 21A or 29A in the width monostable so it is readily seen that by changing the series resistance $R_{series}$ (21B or 29B) in unison with the width control, the output of the integrator is directly proportional to the input voltage $E_{in}$ and completely independent of the width of the sample ($t$).

At this point it should be noted that due to the presence of the divide by two counter 71 of FIG. 3 only one of the gates 89 and 91 will be enabled for a given field of the two field video frame while the other gate will be enabled for the other field thus allowing the vast majority of the remaining circuitry to be time shared for each of the two sampling areas.

The output from the integrator circuit is the integral value of the gated video input. When the input to the integrator is removed the integrator output holds at a constant value so the analog to digital conversion may take place at other than the precise time during which the integrator is receiving its input. This integral is supplied to a comparator 99 which has as its other input the output of a ramp generator 101. The comparator 99, ramp generator 101, clock 103 and counter 105 form the basic elements of an analog to digital convertor for converting the integral of the scene sample to a digital representation. To effect this conversion the counter 105 is set to zero by the trailing edge of the signal on line 85 and the ramp generator 101 started at the same time that clock pulses are passed to the counter by way of AND gate 107. When the ramp generator output reaches the same value as the integrator output the comparator 99 so indicates and disconnects the clock 103 from the counter 105 by disabling the AND gate 107. The value thus stored in the counter is a digital representation of the integrator output and about every one half to two seconds this value is gated into the memory 109 upon the occurrence of a memory refresh signal.

Memory 109 is a two word digital memory providing separate storage for the digital representation of the average value of the video integrated from both area 1 and area 2.

Once for every frame a value stored in memory 109 and the count accrued in the counter 105 for a given area are subtracted in the digital adder 111 and the absolute value of this difference is compared in a digital comparator 113 to some operator selectable predetermined digital threshold word. This threshold can be adjusted by means of the sensitivity controls 37 and 39 independently for each area under surveillance and can be set to optimize detection and minimize the occurrence of false alarms for each application.

Figure 5:
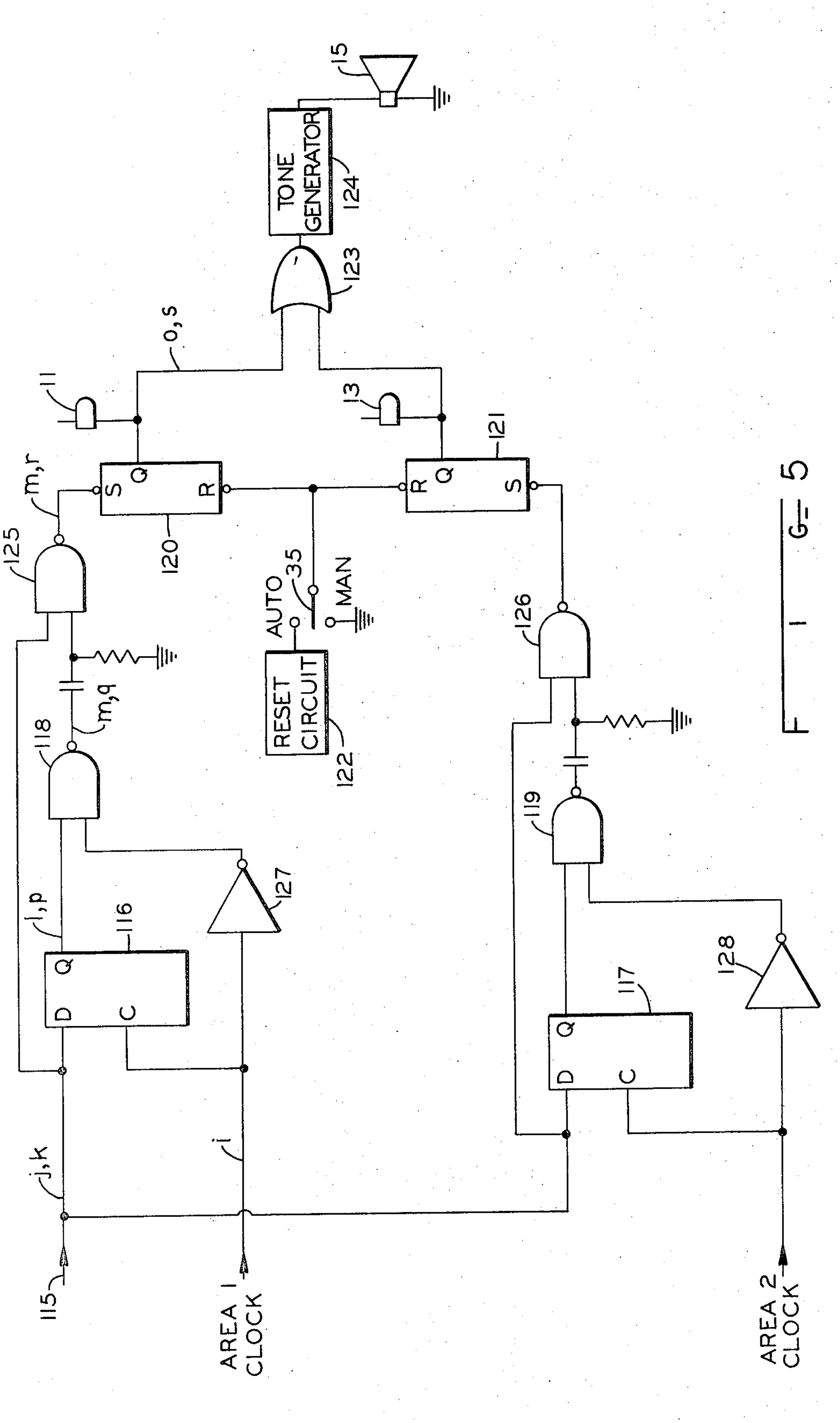
FIG. 5 is a detailed block diagram of the alarm circuitry of FIG. 1.

If the absolute values of the difference between the memorized average value of the video and the current average value of the video exceeds the selected threshold value, an indication is sent to the alarm memory shown in FIG. 5.

The memory refresh signal is generated by a free running (unijunction) oscillator with a period adjustable from about 0.5 to 5 seconds. The adjustment over this range allows the system to be optimized again to each specific application. When set to the longer period, the system is made more sensitive to very gradual changes in video (slowly moving objects) and when adjusted to the shorter period, more tolerant of changes in video caused by camera drift and ambient scene lighting variations. It is this memory update cycle time that automatically compensates for changes in ambient scene light and camera drift.

The average video from successive frames is compared to the average value stored in memory. By comparing each successive frame, any rapid change will be detected at the instant of occurrence and by comparing these individual video averages over the memory refresh period any relatively gradual changes will also be detected. This long time comparison allows the slow gradual changes from a slow low contrast intrusion ample time to integrate to a value sufficient to exceed the threshold. The utilization of the digital memory allows storage for this extended period of time without loss of signal such as occurs when a long storage time is attempted with a large high quality storage capacitor. With digital memory extremely large storage times can be obtained without loss of signal due to component aging and temperature drift which is conventional analog circuits may reduce the maximum sensitivity realizable.

Figure 6:
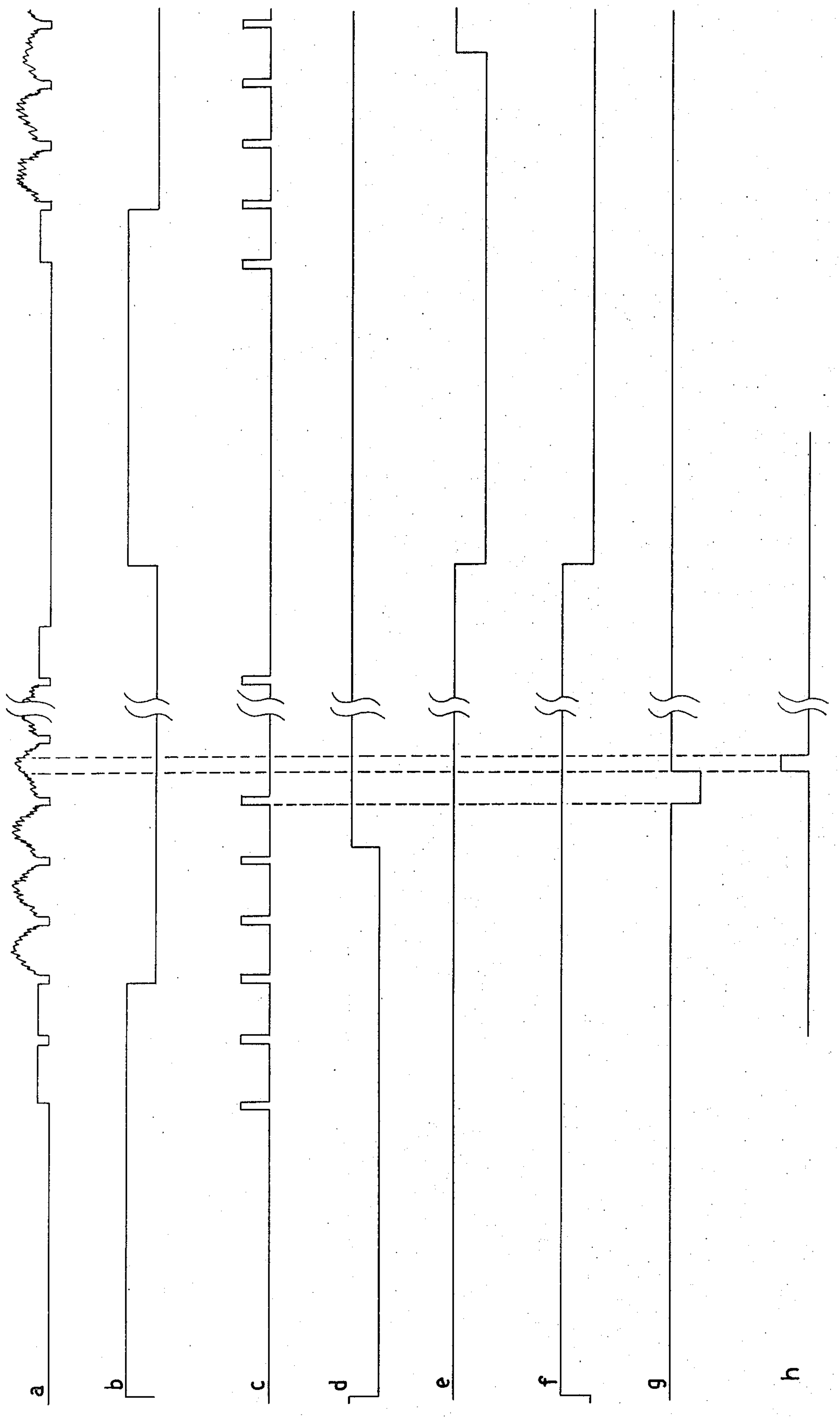
FIGS. 6 and 7 illustrate waveforms associated with the circuits of FIGS. 3 and 5 respectively.
Figure 7:
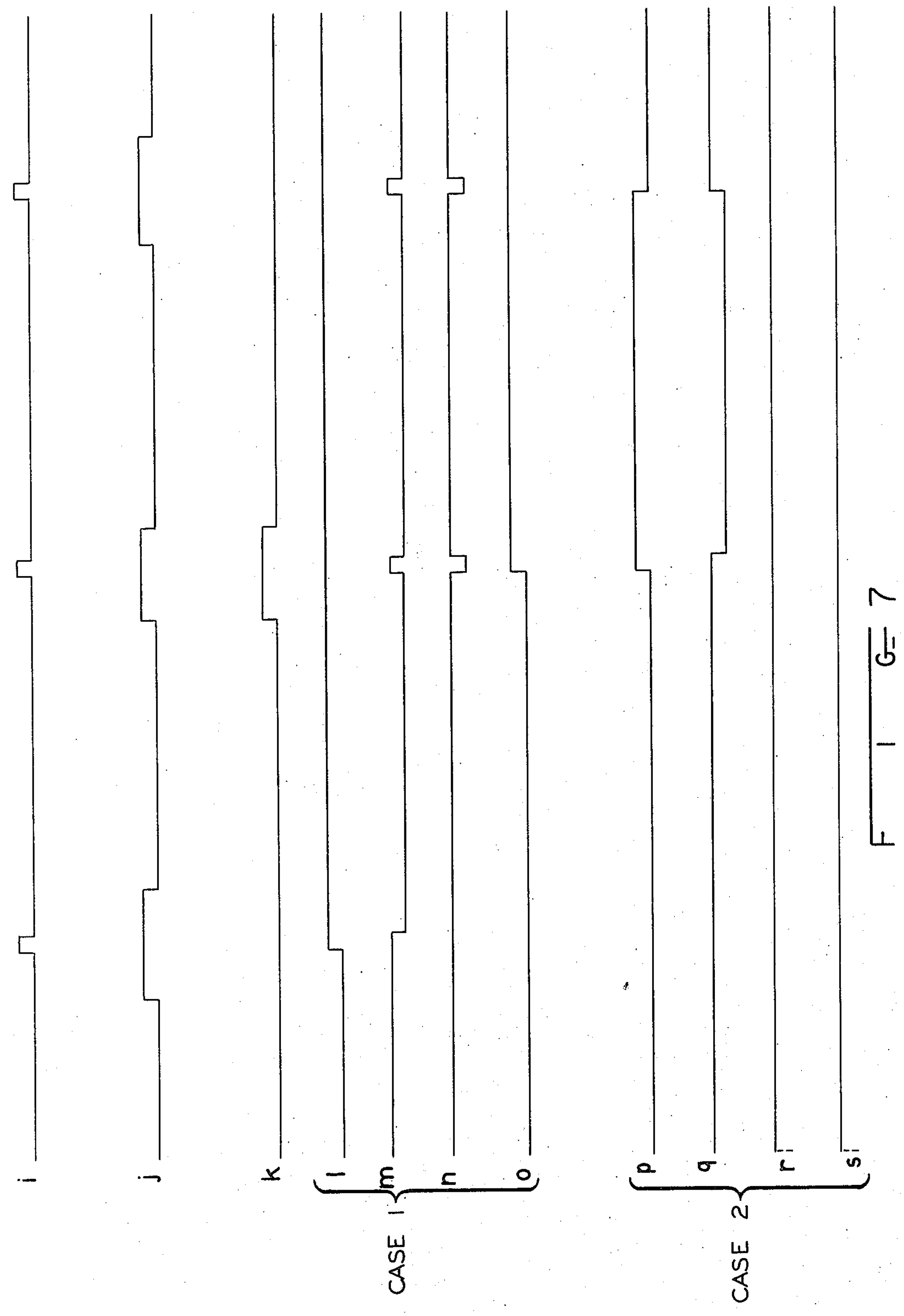

FIGS. 6 and 7 illustrate some of the waveforms associated with the invention as thus far discussed and may serve to clarify the circuitry involved. Considering first FIG. 6 in conjunction with FIG. 3, waveform *a* illustrates some of the active scan lines for field number 1 followed by some of the active scan lines for field number 2. In other words, waveform *a* would be that signal appearing at 59 in FIG. 3. Waveform *b* shows the vertical synchronization signals appearing at the output of the sync separator on line 67, and similarly waveform *c* illustrates that sync separator output on line 69. The monostable multivibrator 75 produces a negative going pulse illustrated as waveform *d* and the position of the trailing edge of this negative going pulse is determined by the setting of the variable resistance 17. This trailing edge in conjunction with the leading edge of the next successive horizontal sync signal is conjunctively gated through the D flip-flop 77 to trigger a negative going pulse waveform *g* as the output of the multivibrator 79. The trailing edge of waveform *g* again is determined by the setting of the horizontal position variable resistor 19. The trailing edge of the negative going pulse of waveform *g* in turn triggers the monostable multivibrator 81 to produce waveform *h*, and again the time duration of this pulse and thus the location of the trailing edge of this pulse is determined by the setting of the width control 21A. Waveform *h* as illustrated by the dotted lines performs the actual function of selecting a portion of a given scan line of waveform *a*. Waveform *e*, of course, is the negative going pulse which serves to select a given scan line from the second field in accordance with the positioning of its trailing edge, and waveform *f* is the output of the divide by two circuit 71 on line 73. Thus in summary the trailing edge of waveform *d* is positioned by varying the resistor 17 and this serves to select one of the scan lines from field 1 upon the occurrence of the next successive horizontal sync pulse to trigger the multivibrator 79. The trailing edge of the output of the negative going pulse from multivibrator 79 is adjusted by changing the variable resistance 19, and this trailing edge defines the beginning of the actually selected sample by triggering a positive going pulse waveform *h* in the monostable multivibrator 81. The actual width of the selected sample is then determined by the resistor 21A which determines the position of the trailing edge of waveform *h*.

The alarm circuit shown in FIG. 5 is an improvement over that shown in FIG. 4 and serves to process data to further reduce the possibility of false alarms especially those caused by a random noise spikes occurring in the closed circuit TV system whether it be introduced in the camera, cabling, motion detector circuitry or caused at optical wavelengths by a short duration light flash. The circuit performs this rejection of transients by requiring that two successive values of average scene video exceed the memorized value by more than the threshold value. Thus a change in video during a single frame such as may be caused by a line transient would not be interpreted as an alarm situation providing the video returned to the neighborhood of its memorized value by the following frame. This refinement serves to greatly reduce false alarms especially when the system is operating in an industrial environment where heavy motor loads (elevators, air conditioners, etc.) are being switched in proximity to the CCTV installation.

The alarm circuit of FIG. 5 receives a logical 1 signal from the comparator via line 115 when the difference in average video between the stored value and current value exceeds the threshold setting. These are illustrated as waveforms *j* and *k* of FIG. 7. The alarm circuit consists of two identical channels for processing and displaying the alarm. One channel consisting of 116, 118, 120, 125, 127 and 11 is used for area one alarm data and the other consisting of 117, 119, 121, 126, 128 and 13 is used for area two. Several functions such as the tone generator 124, speaker 15, reset control 122 with switch 35, and OR gate 123 are common to both channels. The operation of the area 1 channel in conjunction with the waveforms of FIG. 7 will be described in detail with the operation of the area 2 channel being identical.

When a logical 1 is received on line 115 this signal is presented to the D input of a D latch 116. A clock signal (waveform (i)) is generated by the timing section of the intrusion alarm system and used to clock the D latch 116 at such a time that the data present on the D input is known to be valid. This clock is generated at the end of field 1 (field 2 for area 2 and D latch 117) at a time when the valid comparison is being made and all switching transients have decayed. The logical 1 at the D input is clocked to the previously low Q output of 116 to provide waveform *l* or *p*. The output of NAND gate 118 has been high and goes low now when the clock coupled through inverter 127 falls. At the very next clock pulse (one frame later) the output of 118 will rise and will be capacitively coupled to one input of NAND gate 125. If the output of the comparator again indicates the threshold has been exceeded on this successive frame, as in case 1 of FIG. 7, the high level from the comparator coupled to the other input of NAND gate 125 via 115 and being in coincidence with the rising output of 118 will cause the output of 125 to fall as in waveform *n* and in turn set the Q output of R–S flip-flop 120 to a high state as in waveform *o*. This high state on the output of 120 causes the area 1 warning indicator 11 to be illuminated and is also coupled through the OR gate 123 to actuate the tone generator and speaker driver circuit 124. This tone generator and speaker driver supplies power to speaker 15 resulting in an audible alarm tone. The R–S flip-flop remains locked in the alarm (set) state until the reset, R, line is returned low either by placing the reset switch 35 in the manual position or by placing the reset switch in the auto position and waiting for the automatic reset circuit 122 to reset the alarm.

The automatic reset circuit 122 is a variable period relaxation oscillator whose start is synchronized to the alarm indication. After a preset time (2 to 10 seconds nominally) following an alarm, the reset lines of R–S flip-flops 120 and 121 are automatically returned to ground when reset switch 35 is in the auto position.

This automatic reset feature provides unattended operation when used in conjunction with auxillary Video Tape Recorder, or for instance a remote indicator console.

If a second case is assumed where the difference video does not exceed the threshold on two successive frames, it will be shown how the alarm processor circuit rejects a single threshold crossing as a random false alarm.

Assume as before that the area 1 clock has transferred a logic 1 signal from the threshold comparator 113 via 115 to the output of the D latch 116. Again the output of 118 is in the low state and will rise at the clock pulse from the succeeding frame. Assume this time, however, that on the succeeding frame the threshold is not exceeded and thus a low level exists on line 115. Thus at the next clock pulse the output of NAND gate 125 will *not* go low as before but will remain high as in waveform *r* thus not affecting the alarm latch 120.

The clock pulse at this time also transfers the low state existing on line 115 to the output of the D latch 116 thus returning the alarm processor circuitry to the state existing before the first threshold crossing. At this point it is again required to get two successive threshold crossings to trigger the alarm indicators as described for the first case.

The operation of the second channel for area 2 is identical except for the timing of the clock. The area 2 clock is timed to coincide with the valid comparison of area 2 (field 2) data in the comparator 113.

Thus the relatively simple circuitry of FIGS. 3, 4 and 5 serves to monitor a selectable portion of one scan line in each field of an incoming video signal and to provide an alarm indication when either of these portions (or two successive portions in one field) deviates from a specified predecessor by more than a predetermined amount thus indicating motion in the scene being monitored.

Figure 8:
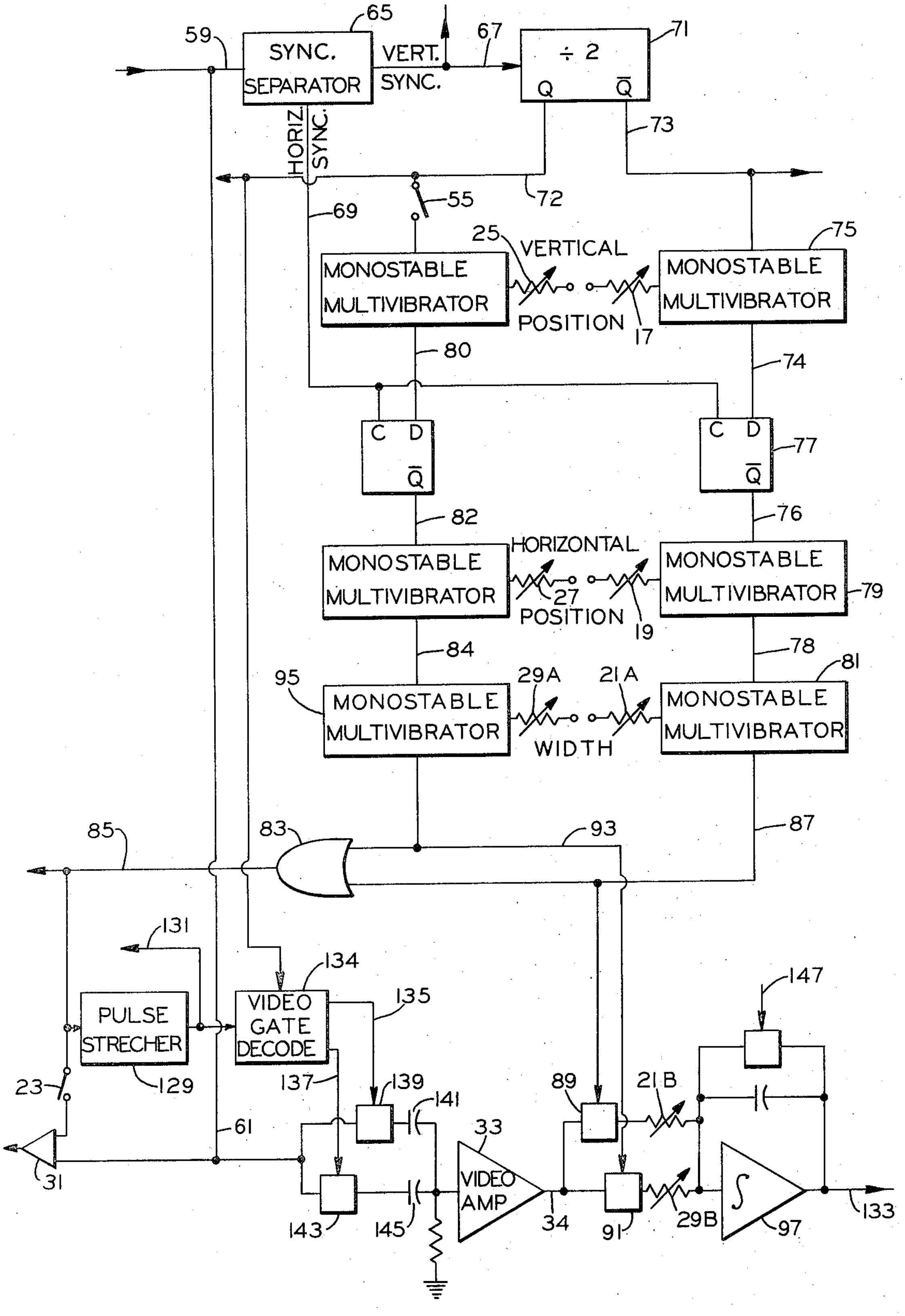
FIGS. 8 and 9 together form a more detailed block diagram of the present invention in its preferred form.
Figure 9:
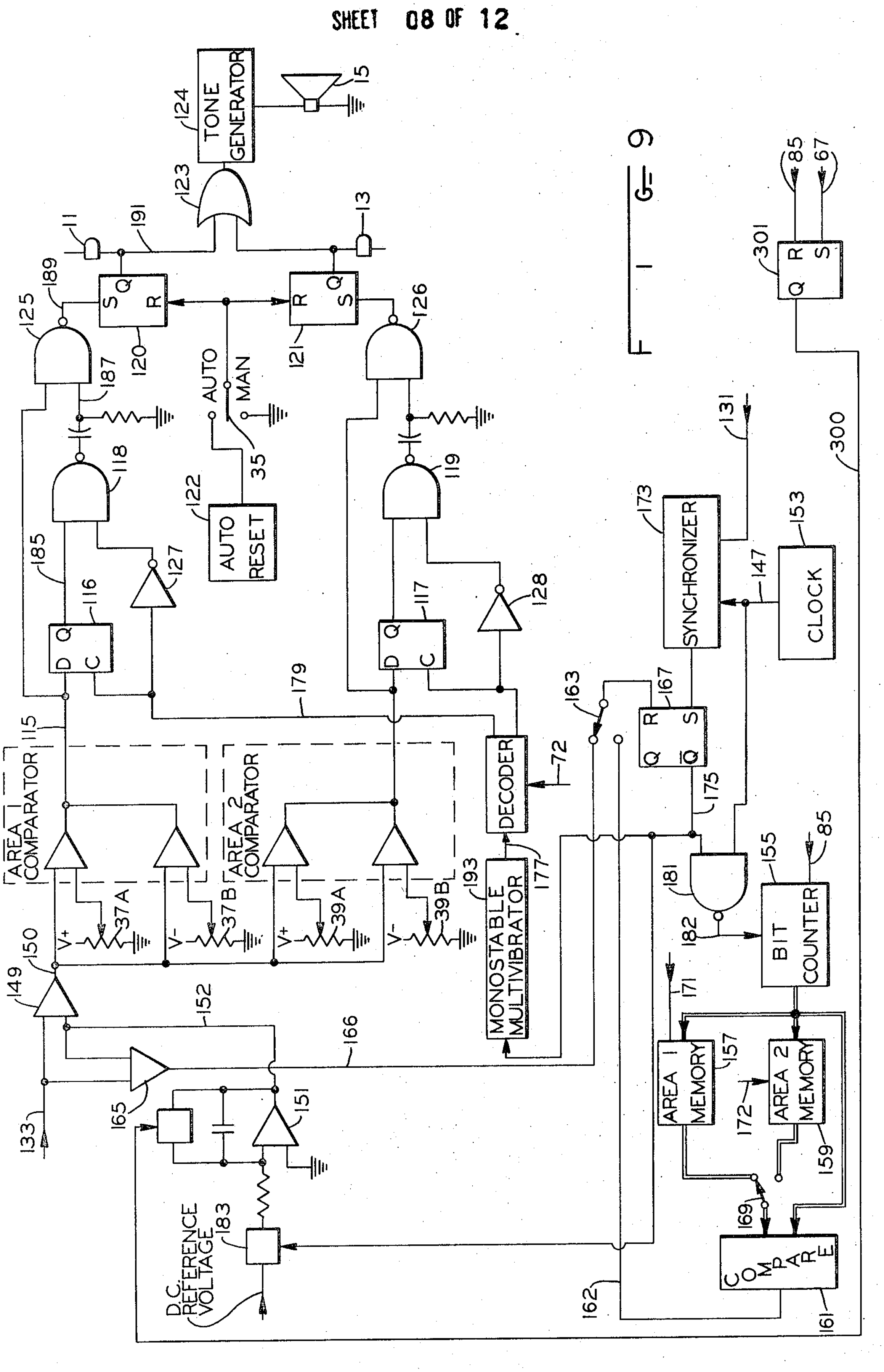
Figure 10:
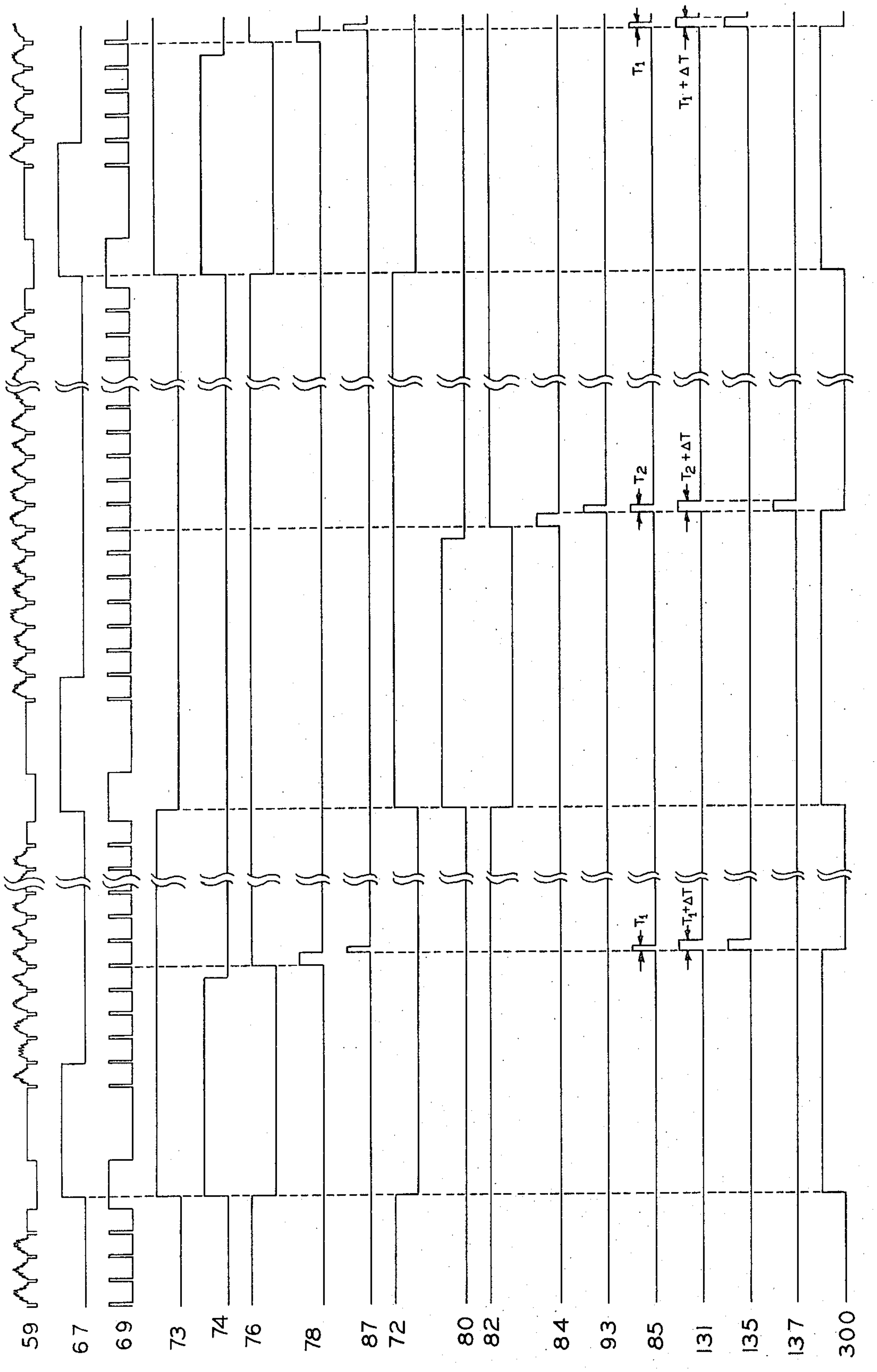
FIGS. 10, 11, 12*a* and 12*b* illustrate waveforms at various points in the embodiment of FIGS. 8 and 9.

Turning now to FIGS. 8 and 9 which illustrate the fundamental system as heretofore described in its preferred embodiment employing several improvements on the circuitry illustrated in FIGS. 3, 4 and 5, only the improvements will receive a detailed discussion. Those elements of FIGS. 8 and 9 having functional equivalents in FIGS. 3, 4 and 5 bear the corresponding reference numerals from FIGS. 3, 4 and 5. The circuitry of FIG. 8 begins to differ from that illustrated in the earlier embodiment when the output of the summer 83 is supplied to a pulse stretching circuit 129. This pulse stretcher increases the width of the pulses supplied to it by a constant amount ($\Delta t$) which in the preferred embodiment was selected to be ½ microsecond. This is illustrated by the waveforms in FIG. 10 identified by corresponding reference numerals 85 and 131 in which T1 is the duration of the enabling signal for field number 1 while T2 is the duration of the enabling signal for field number 2, and the pulse stretcher 129 functions to extend the trailing edge of these respective pulses by a $\Delta t = 0.5$ microseconds. The thus extended enabling pulses for the first two fields are supplied to a video gate decode circuit 134 which functions to separate this series of pulses into a pair of pulse trains, one for each field, on lines 135 and 137 respectively. The waveform appearing on line 72 and denoted 72 in FIG. 10 was selected as the control signal for this video gate decoding circuit 134. In other words, when line 72 is high the decoder 134 passes its pulses to line 137, whereas when line 72 is low the decoder circuit passes the pulses to line 135. Of course, the pulse train appearing on line 137 corresponds to that appearing on line 93 except for the increased pulse width caused by the pulse stretcher 129, and similarly the signal appearing on line 135 is merely that appearing on line 87 with the trailing edge of each pulse occurring .5 microseconds later than those on line 87.

These two trains of stretched pulse signals are employed to gate video information incoming on line 61 to the video amplifier 33 by way of either gate 139 and capacitor 141 or gate 143 and capacitor 145. A similar structure was illustrated in FIG. 4 subsequent to the variable gain amplifier 33 employing but a single gate and resistance-capacitance network, however, the two fields no longer share a common capacitor in the present embodiment. The input for field number 1 may, for example, be by way of capacitor 141, whereas the input for field number 2 is by way of capacitor 145. Thus for field number 1 incoming video signals on line 61 are gated to the video amplifier 33 by way of gate 139 and thence to the integrator 97 by way of gate 89. It should be noted that gate 89 opens 0.5 microseconds prior to the opening of gate 139 so that the integrator 97 does not receive and integrate any switching transients which may occur when the gate 139 is disabled. One function of the resistance-capacitance network (which may be considered as two separate networks one for each field) is to remove the direct current component from the incoming video information signals and the respective capacitors function to average the video samples about zero. In other words, when a steady state condition is reached and the video sample is not changing (no motion in the monitored area) the average value of the video sample at the input to video amplifier 33 will be zero.

This video sample will then be passed from the amplifier 33 by way of the corresponding gates and variable resistances to the integrator 97. The sample is attenuated by the particular variable resistance involved to maintain a constant detection sensitivity as the width of the gated video is varied by the corresponding monostable multivibrator. This is most easily accomplished by mechanically coupling the variable resistor 21B to the variable resistor 21A and coupling the variable resistance 29B to the corresponding variable resistance 29A.

Because of the averaging effect of the resistance-capacitance network involved, the value of the integral of the video sample for a static scene will be approximately zero, and this integral is supplied to a difference amplifier 149 of FIG. 9 which has as its other input the output of a ramp generator 151. The integral may not be quite zero since direct current offset and drift of the video amplifier 33 and operational amplifier 97 as well as other minor offsets caused by the sampling process may occur. The integrator 97 and the ramp generator 151 have been illustrated here and elsewhere in the disclosure as operational amplifiers having a capacitive feedback network and a switching device for periodically discharging that capacitor. In the case of the integrator 97 the capacitor is periodically discharged in accordance with the output signals from R-S flip-flop 301 (FIG. 9). The R–S flip-flop is set (capacitor discharge) by the vertical sync signal on line 67, and reset at the beginning of the next video sample pulse on line 85. This same signal serves to discharge the capacitor associated with the ramp generator 151.

Figure 11:
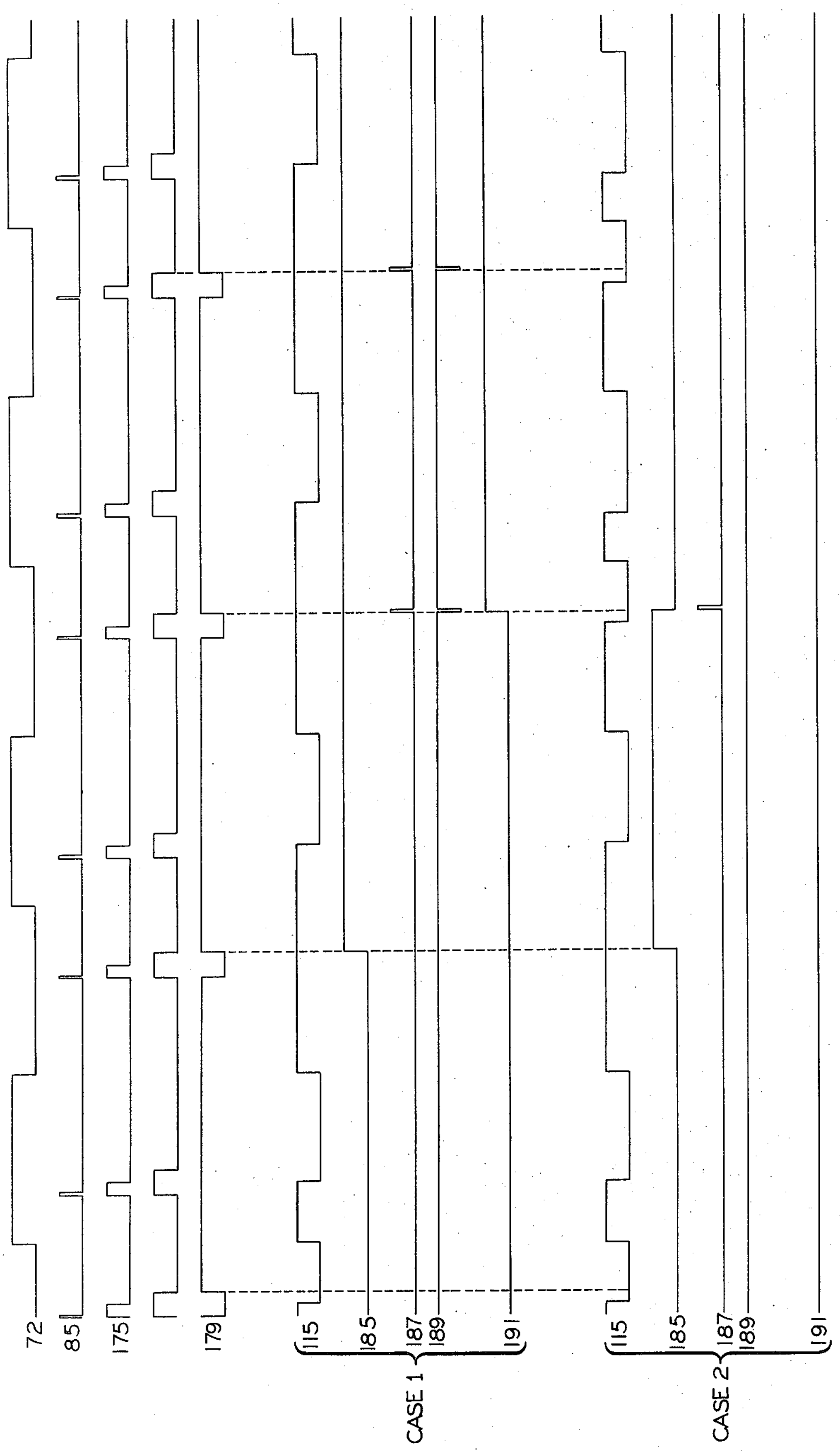

The comparator 149, ramp generator 151, clock 153, counter 155, memories 157 and 159, and digital comparator 161 form the basic elements of an analog-digital-analog convertor for converting the integral of the scene sample to a digital representation and then at a later time converting the digital representation back to an analog signal for comparison with the integral of the scene sample at a later time. To effect this analog to digital conversion the counter 155 is set to zero by a pulse on line 85 which is illustrated in FIG. 11 as bearing the same reference numeral. Electronically actuated switch 163 couples the output of the comparator 165 to the reset terminal of the flip-flop 167 and electronically actuated switch 169 couples the output of the area 1 memory 157 to the digital comparator 161, and the area 1 memory 157 is enabled for receiving digital information by a synchronized signal on line 171. The start of the conversion is synchronized with the clock 153 by the synchronizer 173. The output of the synchronizer sets flip-flop 167 which simultaneously enables NAND gate 181 to pass clock pulses to bit counter 155 and starts the ramp generator 151 by enabling the gate 183. When the ramp generator 151 output reaches the same value as the output of the integrator 97 the comparator 165 so indicates and disconnects the clock 153 from the counter 155 by resetting flip-flop 167 and thus disabling the NAND gate 181. The value accumulated in the bit counter 155 is transferred to and stored in area 1 memory 157 and is a digital representation of the integrator output. About every ½ to 2 seconds the memory is erased and a new value from the bit counter entered upon the occurrence of a memory refresh signal.

The memory refresh signal is generated like that of FIG. 4 by a free running (unijunction) oscillator having a period adjustable from about ½ to 5 seconds and, of course, adjustment over this range allows the system to be optimized to each specific application. When set to the longer periods the system is more sensitive to gradual changes in video corresponding to slowly moving objects and when adjusted to the shorter periods the system is more tolerant of changes caused, for example, by camera drift or variations of the scene lighting conditions.

Figure 12A:
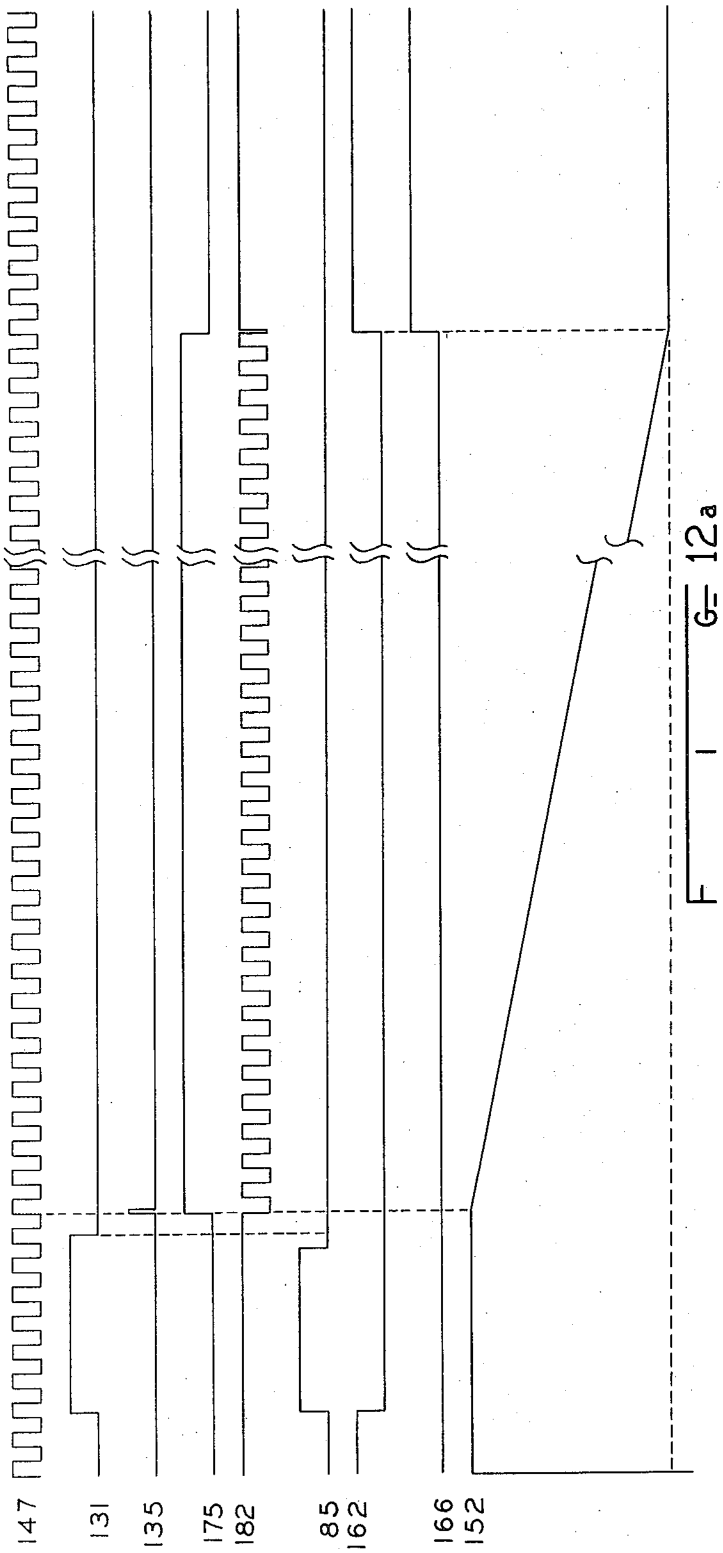
Figure 12B:
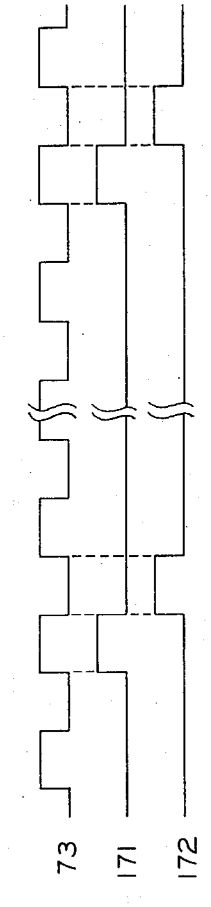

During field number 2 which corresponds to the higher portions of the waveform 72 of FIG. 11 the memory 159 is loaded in a fashion identical to that previously explained for memory 157. To recover the stored information at a later time counter 155 is reset to zero, electronic switch 163 changed so as to couple the output of the digital comparator 161 to the reset terminal of flip-flop 167, electronic switch 169 energized to couple the memory of interest to the comparator 161, the memory area of interest disabled from receiving information by the appropriate signal, for example, on line 171, and the ramp generator 151 is started at the same time that clock pulses are passed to the counter 155 through NAND gate 181. When the value accumulated in counter 155 is equal to the value stored in, for example, memory 157 the digital comparator 161 provides an output indication and disconnects the clock 153 from the counter 155 by disabling NAND gate 181 and simultaneously disabling ramp generator 151 by providing an output signal on line 175 from the flip-flop 167. In the preferred embodiment the two memory locations and the counter 155 each had an eight bit storage capacity. When the input to the ramp generator is removed the output holds at a constant value as illustrated in FIG. 12a which is supplied as one input to the analog difference amplifier 149 which receives as its other input the integral of the present video sample. This analog difference amplifier 149 supplies an analog output signal which represents the difference between its two input signals to the alarm circuit inputs comprising the area 1 and area 2 comparators.

At the beginning of the next field the ramp generator and counter are reset and electronic switch 169 changed so as to connect the area 2 memory to the digital comparator. After the integral of the area 2 scene sample is computed, the stored digital representation of the integral of the area 2 scene previously stored in memory is converted back to an analog voltage in the manner previously described. The stored value and the present value are compared so as to detect both rapid and slow changes in the scene sample. The computed difference between the stored average value and the present average value of the scene sample is supplied to the alarm circuitry which processes the data from the difference amplifier in a manner to determine if an alarm situation has occurred and in a manner to reduce the possibility of false alarms. The alarm circuit rejects transient alarm situations such as random noise spikes occurring in the system by requiring two successive values of the average sample to exceed a threshold value which is set by the sensitivity potentiometer 37 or 39. These potentiometers are mechanically coupled pairs of variable resistors as illustrated in FIG. 9. By requiring two successive integrals to exceed the threshold, numerous false alarm triggering transients are eliminated with no reduction in sensitivity. This is particularly true for systems operating in an industrial environment where heavy motor loads such as elevators, air conditioners and production machinery are being switched in proximity to the closed circuit television installation. The alarm circuit itself consists of two identical channels for processing and displaying the alarm.

When the difference between a current value and the stored value exceeds a threshold as set by the resistances 37A and 37B the area 1 comparator supplies a logical 1 by way of line 115 to the D input of the D type flip-flop 116. Resistor 37A serves to define the positive threshold while resistor 37B defines a negative threshold and, of course, depending upon the mechanical linkage as well as the specific resistance and variation in that resistance these two thresholds may be equal in absolute value.

Monostable multivibrator 193 delays the clocking of the alarm circuitry until all of the digital to analog conversions are completed and all switching transients have decayed. The output of this monostable multivibrator is supplied by way of line 177 to a decoder which provides separate clocking signals for areas 1 and 2, that for area 1 being illustrated in FIG. 11.

Case 1 illustrated in FIG. 11 is a situation where the threshold has been exceeded in two or more consecutive frames. The first time this threshold is exceeded the logical 1 appearing at the output of the comparator on line 115 is transferred to the Q output of flip-flop 116 when the clock pulse on the C input goes high. This logical 1 now appearing on line 185 enables NAND gate 118 to pass the next clock pulse which appears at the output of the inverter 127. The resistance-capacitance network following the output of NAND gate 118 differentiates the pulse appearing at the output of the NAND gate. If the comparator output on line 115 is high for the second clock pulse NAND gate 125 will pass the differentiated pulse appearing at its input to set the R–S flip-flop 120 in the alarm state. This automatic alarm circuit is basically that illustrated and discussed previously in reference to FIG. 5 and the waveforms for cases 1 and 2 correspond in all essential respects to those previously discussed.

Figure 13A:
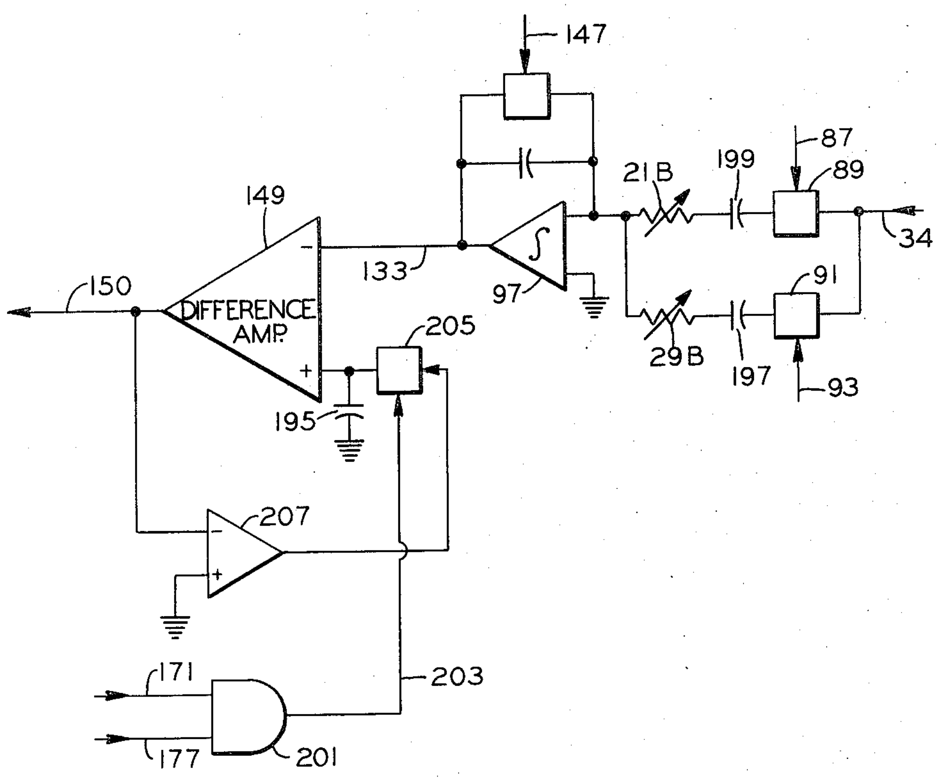
FIGS. 13*a* and 13*b* illustrate an analog storage scheme and its associated waveforms which might be employed as an alternative in the circuitry of FIGS. 8 and 9.
Figure 13B:
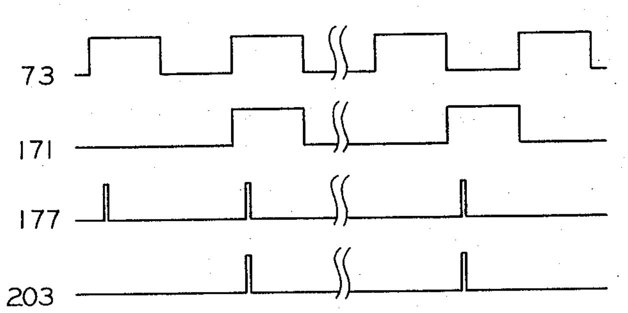

By using an analog storage technique a considerable saving in cost may be obtained because of the reduced number of components required. FIG. 13*a* illustrates in block diagram form an analog storage technique with corresponding waveforms illustrated in FIG. 13*b*. Those portions of the circuit of FIG. 13*a* having reference numerals common to FIGS. 8 and 9, of course, are coupled to those points in the circuit of FIGS. 8 and 9, and the basic integrator circuitry illustrated in FIG. 13*a* is substantially identical to that illustrated in FIG. 8 except for the presence of the capacitors 197 and 199. Instead of storing the integral of the scene sample in a digital memory the integral is now stored as an analog voltage on the capacitor 195. Note that only one storage element 195 is used instead of the two digital memories previously required. This reduction in storage elements is brought about by processing the video scene samples in such a manner that when there is no motion in the sample the final values of the integrals for area 1 and area 2 samples are equal. This processing is accomplished by adding the capacitors 197 and 199 in series with the area 1 and area 2 inputs to the integrator 97. The capacitors 197 and 199 serve to decouple from the integrator input any direct current voltage which may appear at the output of the video amplifier on line 34, and thus the final value of the output of the integrator is no longer dependent upon the direct current offset and the drift characteristics of the video amplifier 33. These capacitors 197 and 199 further average the video sample about ground, and thus the average value of that video sample assuming no motion will be zero. This means that the final value of the integrator output will be approximately zero for both areas so long as no motion occurs. One input to the difference amplifier 149 is the final value of the integral of the scene sample while the other input to this difference amplifier is the voltage stored on the capacitor 195.

As before every ½ to 2 seconds a memory update signal synchronized with the alternating field signal on line 73 is generated and supplied on line 171 to enable AND gate 201 to pass the output of monostable multivibrator 193 on line 177. The output of AND gate 201 enables the electronic switch 205 during the period of the monostable multivibrator 193 to form a closed loop comprising the difference amplifier 149 and operational amplifier 207. For this modification it should be noted that monostable multivibrator 193 is triggered by a signal on line 85 of FIG. 8 rather than as illustrated in FIG. 9. With the switch 205 closed operational amplifier 207 charges or discharges the capacitor 195 until the voltage on capacitor 195 equals the voltage from the integrator on line 133, and the output of difference amplifier 149 is zero. Capacitor 195 is a high quality low leakage type, and difference amplifier 149 requires only a very small input current when the electronic switch 205 is opened, and hence the voltage on capacitor 195 stays essentially constant over the one half to two second storage period. The output of the difference amplifier on line 150 is processed in the manner previously discussed in reference to FIGS. 8 and 9.

Thus while the present invention and numerous modifications have been discussed in detail, further modifications will suggest themselves to those of ordinary skill in the art. For example, as illustrated but not discussed in FIG. 1, a video switch 45 may be provided which is responsive to alarm indications from a plurality of processor and alarm circuits to couple the system giving the alarm to a monitor and/or recorder to thus time share the monitor and/or recorder with a plurality of closed circuit television cameras. Still further modifications within the scope of the present invention will suggest themselves to those of ordinary skill in the art, and accordingly the scope of the present invention is to be measured only by that of the appended claims.

I claim:

1. A video motion detector for use in conjunction with at least one closed circuit television camera and at least one video monitor for detecting motion in selected portions of a scene being monitored and providing an alarm indication in response to such detected motion comprising:

input means for presenting a composite analog video signal containing both video information signals relative to a scene being monitored and synchronization information signals to the video motion detector;

means for separating the synchronization information signals from the composite video signal comprising a television synchronization signal separator circuit providing horizontal synchronization signals and vertical synchronization signals as outputs;

means for selectively modifying the thus separated synchronization information signals comprising means provided with two separate output terminals and responsive to the vertical synchronization signals for alternately energizing said output terminals whereby the repetition rate of signals on either output terminal is one half the repetition rate of the vertical synchronization signals, means for selectively retiming each said one half repetition rate signal, a pair of AND gates both responsive to horizontal synchronization signals from said separator circuit and each responsive to a different one of said retimed one half repetition rate signals to provide output signals, and means for selectively retiming each said AND gate output signal so as to provide enabling signals to said gate means;

gate means having inputs for receiving the video information signals and the modified synchronization information signals and adapted to pass the video information signals when both video information signals and synchronization information signals are present at the gate inputs;

means for integrating the thus passed video information signals;

means for converting the integrated video information signals to a digital representation thereof;

means for storing the digital representations of the integrated video information signals; and means for comparing a subsequent video information signal with a stored digital representation of a video information signal and for providing an output alarm signal when the difference between the two last mentioned signals exceeds a predetermined threshold.

2. The video motion detector of claim 1 wherein said means for comparing comprises a digital comparator.

3. The video motion detector of claim 1 wherein said means for comparing comprises means for converting the stored digital representation of video information signals back to analog signals, and an analog comparator.

4. A video motion detector for use in conjunction with at least one closed circuit television camera having two fields of interlaced horizontal scan lines per frame and a video monitor for detecting motion in selected portions of a scene being monitored and providing an alarm indication in response to such detected motion comprising;

means for processing sequentially presented video information signals and to provide an output alarm signal when one of said video information signals exceeds a specified one of its predecessors by at least a predetermined amount;

input means for presenting to the means for processing a composite analog video signal containing both video information signals relative to a scene being monitored and synchronization information signals;

means coupled to said input means and responsive to said synchronization information signals for sequentially presenting not more than one horizontal scan line for each field scanned to said processor, said sequentially presenting means including;

first adjustable means for selecting from a first field a specific horizontal line to be presented, means for selectively limiting the horizontal extent of the thus selected line, and means for adjustably positioning one endpoint of the thus selected line; and second adjustable means for independently selecting from a second field a second specific horizontal line to be presented, means for independently selectively limiting the horizontal extent of the thus selected line, and means for independently adjustably positioning one endpoint of the thus selected line so as to provide two individually selectable line segments, one from each field, to be monitored.

5. The video motion detector of claim 4 wherein said means for sequentially presenting comprises:

a television synchronization signal separator circuit providing horizontal synchronization signals and vertical synchronization signals as outputs;

means provided with two separate output terminals and responsive to the vertical synchronization signals for alternately energizing said output terminals whereby the repetition rate of signals on either output terminal is one half the repetition rate of the vertical synchronization signals.

6. The video motion detector of claim 4 wherein said means for processing comprises:

means for integrating the video information signals presented to said processor;

analog to digital converter means for converting the integrated video information signals to a digital representation;

means for storing selected ones of said digital representations; and means for comparing successive integrated video information signals with the most recently stored digital representation.

7. The video motion detector of claim 6 wherein said means for comparing comprises a digital comparator.

8. The video motion detector of claim 6 wherein said means for comparing comprises means for converting the stored digital representation to an analog signal, and an analog comparator.

9. The video motion detector of claim 6 wherein said means for sequentially presenting comprises:

a television synchronization signal separator circuit providing horizontal synchronization signals and vertical synchronization signals as outputs;

means provided with two separate output terminals and responsive to the vertical synchronization signals for alternately energizing said output terminals whereby the repetition rate of signals on either output terminal is one half the repetition rate of the vertical synchronization signals.

10. In a video motion detector for use in conjunction with at least one closed circuit television camera and a video monitor and having a single video information signal processor for detecting motion in two independently selectable portions of a scene being monitored and providing an alarm indication in response to such detected motion, the improved method of time sharing the video information signal processor comprising the steps of:

separating the vertical and horizontal synchronizing signals from a composite incoming video signal;

providing from the vertical synchronizing signals a pair of signals each having a repetition rate one half that of the vertical synchronizing signals;

independently retiming each said one half repetition rate signals;

conjunctively gating each said retimed one half repetition rate signals and the horizontal synchronizing signals;

retiming the gated signals; and gating the incoming video signals to the video information signal processor in accordance with the retimed gated signals whereby said video information signal processor receives one selected portion of a scene being monitored for each field in a two field frame of video information.

11. A circuit for independent sampling each field of an incoming video signal having a two field per frame format of interlaced horizontal scan lines and for providing an alarm indication when at least one video signal sample differs from a specified one of the preceding video signal samples by at least a predetermined amount comprising:

sampling means responsive to the incoming video signal for providing as an output one sample of not more than one scan line for each field of the video signal;

means for integrating each said sample to provide corresponding signals representative of the average value of that sample;

means for storing selected one of said average value signals;

means for sequentially comparing subsequent average value signals to corresponding stored average value signals for the same field of a previous frame and producing output signals representative of the magnitude of the difference between the signals thus compared; and threshold means for providing an alarm indication when an output signal exceeds a predetermined amount.

12. The circuit of claim 11 further comprising means for periodically replacing the stored average value signals with subsequent average value signals.

13. The circuit of claim 11 wherein the means for storing is a digital storage device and further comprising analog to digital conversion means for converting the said signals representative of the average value of each sample to a digital representation.

14. The circuit of claim 11 wherein the storage means is a single analog device storing a common average value for both fields.

15. The circuit of claim 11 wherein said threshold means further comprises logic means for blocking the alarm indication until two successive video signal samples of the same field differ from the specified one of the preceding video signal samples by said predetermined amount.

16. The circuit of claim 15 wherein the logic means comprises bistable means setable to a first of its stable states in response to a first indication that a field sample has exceeded a specified one of its predecessors by more than a predetermined amount, and means responsive to said bistable means being in the first of its stable states and to a second indication that the sample of a successor field has also exceeded said specified one of its predecessors by more than said predetermined amount for providing an intrusion alarm signal.

* * * * *